Feb. 24, 1942. W. ROTERBERG 2,273,895
ROLLER OR BALL BEARING
Filed Dec. 23, 1938 2 Sheets-Sheet 1
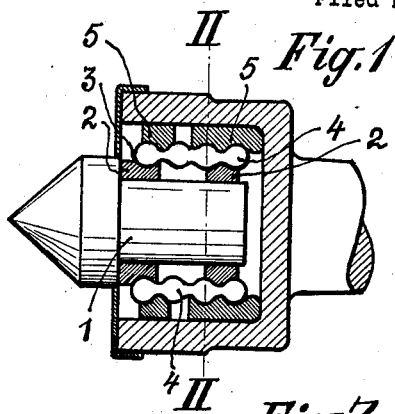
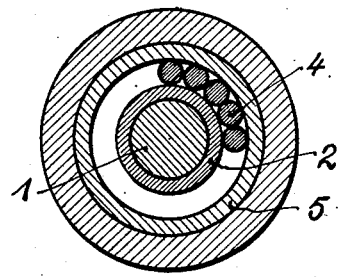
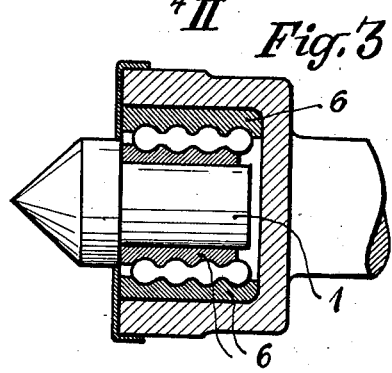
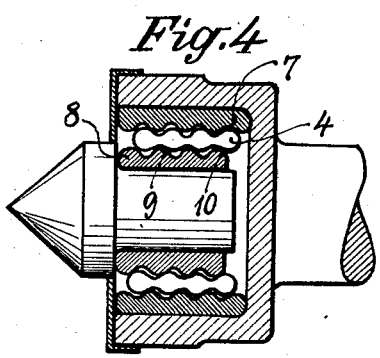
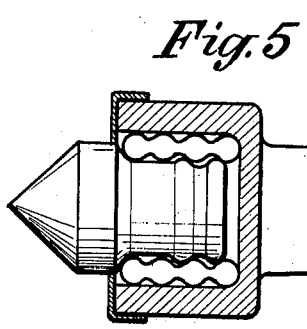
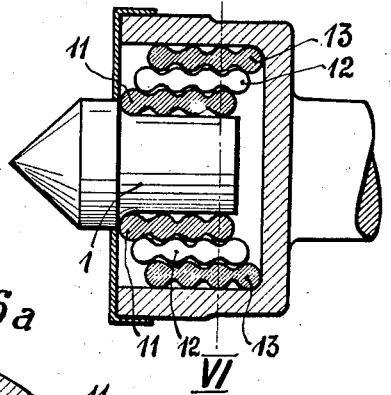
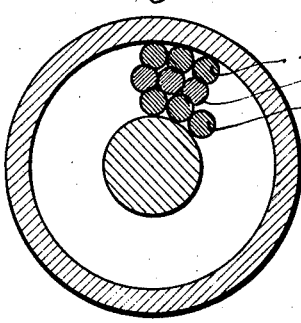
Inventor:
Werner Roterberg
by J. Lokai
Attorney.

Feb. 24, 1942.    W. ROTERBERG    2,273,895
ROLLER OR BALL BEARING
Filed Dec. 23, 1938    2 Sheets-Sheet 2

Patented Feb. 24, 1942

2,273,895

UNITED STATES PATENT OFFICE 2,273,895

ROLLER OR BALL BEARING

Werner Roterberg, Dusseldorf, Germany

Application December 23, 1938, Serial No. 247,322
In Germany December 23, 1937

1 Claim. (Cl. 308—234)

This invention relates to improvements in roller or ball bearings, especially suitable for rotating lathe centres, which consist of a plurality of bevelled roller bearings or ball bearings so arranged that the whole pressure of the workpiece is conducted through all individual bearings.

According to this invention the balls or bevelled rollers in bearings of the above kind are connected together to form a rigid unit or whole, so that a bearing member is formed having a sinuous contour or with a plurality of successively disposed inclined or oblique bearing surfaces.

The inner and outer bushings can, moreover, advantageously be formed either as individual rings or of a single member conforming to the contour of the sinuous bearing. The construction of the sinuous bearing members as well as the bushings or individual bearing rings can be considerably varied.

In order that the invention may be fully understood I shall no describe some embodiments thereof by way of example by reference to the accompanying drawings.

In Fig. 1, I indicates the mandrel of a rotating lathe centre on which are fitted a plurality of bearing rings 2 with concave bearing faces 3. The roller bearing members made sinuous in accordance with the invention are indicated by 4 and the outer bearing rings by 5.

Fig. 2 is a section on the line II—II of Fig. 1.

Fig. 3 shows a modification of the roller bearing. In this case instead of individual bearing rings continuous bushings 6 conforming throughout to the surfaces of the sinuous roller bearing members are provided.

Figure 7:
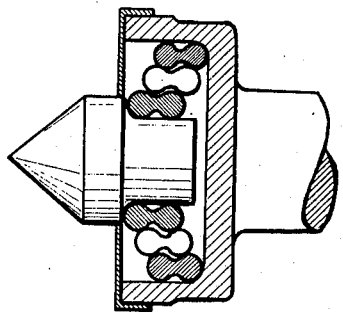

Fig. 4 shows a further modification of a roller or ball bearing constructed in accordance with the invention. In this case the outer rings 7 and the inner rings 8 are likewise made in one piece, but conform to the bearing faces of the sinuous members 4 only at the power transmission positions 9 and 10 and otherwise run freely.

As shown in Fig. 5, the inner and outer rings can, if desired, be omitted and in place thereof the casing as well as the spindle can be shaped or finished, hardened and ground, corresponding to the surface of the bearing members.

Fig. 6 shows a further construction of bearing in accordance with the invention, and Fig. 6a is a section on the line VI—VI of Fig. 6.

Here a number of sinuous or wave-like bearing members 11, 12 and 13 are shown superimposed on one another. By this means a particularly easy running of the bearing is attained without it being necessary to hollow out the space between the spindle and the outer bushing with particular accuracy, as all variations or inaccuracies are compensated by the flexibility of the interengaging bearing members.

In Fig. 7 three superimposed bearing members are shown by way of example, which are formed with only two bulges or rolls with connection between the said bulges.

Figure 8:
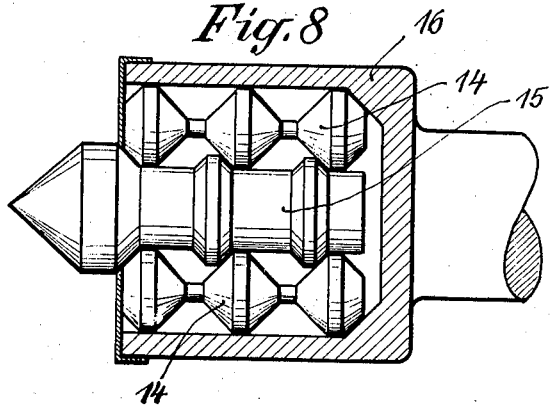

Fig. 8 shows another embodiment of the invention. In this case balls are not provided but bevelled rollers are employed.

The bevelled rollers are united to form a single bearing member 14, which consists of a plurality of successively arranged double conical faces. In this case, moreover, the spindle 15 as well as the casing 16 in place of bearing rings, are shaped to the formation of the bearing surfaces necessary for the transmission of power. Also with this construction the roller bearing members 14 can in the same manner as shown in Fig. 6 be arranged in a plurality of rows lying one upon the other.

The manufacture of the novel bearing members and bushings can be effected in a number of ways. Thus balls intended, for example, for the manufacture of bearing members and conforming accurately as regards dimensions can, after careful adjustment or registering, be electrically welded together. Obviously, however, the sinuous bearing members can also be finished with the help of a forming tool and subsequently hardened and ground. Correspondingly the manufacture of the bushings can also be effected either in the form of separate rings with or without the subsequent combining of these rings, or in the form of continuous members.

The novel roller or ball bearings can be employed not only for rotating lathe centres but also for the journalling of all rotating spindles, mandrels and other machine parts in which considerable axial or radial pressures occur simultaneously or intermittently and must be absorbed. By the use of the bearing constructed in accordance with the invention the shaft or rotating spindle carried thereby, which is subjected to a certain pressure, is automatically adjusted on the wear of the roller bearing under the pressure of the workpiece and thus to the extent of the wear of the bearing.

The invention, moreover, enables an essential simplification in the manufacture to be achieved compared with existing types of roller or ball bearings as well as considerable advantages on the assembly and dismantling of the bearings. By the use of the sinuous bearing members in accordance with the invention it is not necessary to give the bearing rings or the bushes a very true sliding fit, that is to say to form an extremely accurate sliding fit, but the rings can be simply arranged without reference to the differences present or arising in the bearing, as the latter can be automatically adjusted. A sliding of the bearing rings in their seat can also not take place in the improved construction. If desired the bearing rings can be completely omitted and instead the spindle and the casing of the bearing can be shaped to conform to the bearing surfaces, and in this way the diameter of the whole bearing can be considerably reduced so that a considerable saving of material results. Moreover, the improved construction allows of a greater number of power transmission positions even on relatively short bearing members. In bearings as heretofore proposed, on account of the relatively large sources of error, each individual bearing position must be of sufficient dimension to absorb the whole pressure, in order also to take account of exceptionally unfavourable pressure distribution. In the construction of roller or ball bearing according to the invention, owing to the removal of these sources of error, an approximately uniform pressure distribution on all the power transmission positions can be reckoned with in practice so that the bearing members can be kept correspondingly weaker.

The above described embodiments can manifestly be modified in many respects, for example as regards the sinuosity and the wave distribution of the bearing members and also as regards the number of the waves or undulations.

I claim:

In a bearing for lathe centers and the like, the combination including a mandrel having a shoulder, a cup-like bearing housing for receiving said mandrel, a cover for said cup and surrounding said mandrel, and a plurality of roller bearings arranged concentrically in said housing about the mandrel, each of said bearings consisting of an elongated one-piece body having a plurality of spherical main bearing surfaces connected by intermediate portions of such length as to provide each of said bearing surfaces with opposite thrust bearing areas to absorb axial thrust when the bearings are juxtaposed in concentric annular rows about the mandrel and within the housing, the bearings of each row being displaced axially inwardly relative to the said shoulder of the mandrel.

WERNER ROTERBERG.